(12) United States Patent
Shimada et al.

(10) Patent No.: US 7,519,665 B1
(45) Date of Patent: Apr. 14, 2009

(54) MULTI-CHANNEL PROCESSING CONTROL DEVICE AND MULTI-CHANNEL PROCESSING CONTROL METHOD

(75) Inventors: Takashi Shimada, Kawasaki (JP); Yasunori Naruse, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 908 days.

(21) Appl. No.: 09/717,262

(22) Filed: Nov. 22, 2000

(30) Foreign Application Priority Data

Mar. 30, 2000 (JP) ............................. 2000-093114

(51) Int. Cl.
G06F 15/16 (2006.01)

(52) U.S. Cl. .................... 709/206; 709/204; 709/205; 709/207; 379/265.01; 379/265.02; 379/308; 379/309; 379/265.13; 370/395.42; 370/395.43; 370/444

(58) Field of Classification Search ............ 709/200, 709/204–207; 379/265.01–265.02, 265.13, 379/309; 370/395.42–395.43, 444
See application file for complete search history.

(56) References Cited

U.S. PATENT DOCUMENTS

| 5,467,391 A | 11/1995 | Donaghue, Jr. et al. | |
| 5,519,773 A | 5/1996 | Dumas et al. | |
| 5,557,608 A * | 9/1996 | Calvignac et al. | 370/389 |
| 5,586,179 A * | 12/1996 | Stent et al. | 379/265.11 |
| 5,793,861 A * | 8/1998 | Haigh | 257/693 |
| 5,815,566 A | 9/1998 | Ramot et al. | |
| 5,901,296 A * | 5/1999 | Lackman et al. | 710/113 |
| 6,188,670 B1 * | 2/2001 | Lackman et al. | 370/231 |
| 6,212,200 B1 * | 4/2001 | Iizuka et al. | 370/468 |
| 6,226,377 B1 * | 5/2001 | Donaghue, Jr. | 379/265.13 |
| 6,272,109 B1 * | 8/2001 | Pei et al. | 370/230 |
| 6,338,046 B1 * | 1/2002 | Saari et al. | 705/34 |
| 6,704,409 B1 * | 3/2004 | Dilip et al. | 379/265.02 |
| 6,721,325 B1 * | 4/2004 | Duckering et al. | 370/395.4 |
| 6,985,576 B1 * | 1/2006 | Huck | 379/265.09 |

FOREIGN PATENT DOCUMENTS

| EP | 0 551 715 A2 | 7/1993 |
| EP | 0 825 753 A2 | 2/1998 |
| JP | 04-344757 | 12/1992 |
| JP | 07-030946 | 1/1995 |
| JP | 10-304073 | 11/1998 |
| JP | 2000-244568 | 9/2000 |
| JP | 2001-519101 | 10/2001 |
| JP | 2001-522201 | 11/2001 |
| JP | 2002-503903 | 2/2002 |

(Continued)

Primary Examiner—Kenny S Lin
Assistant Examiner—Duyen Doan
(74) Attorney, Agent, or Firm—Staas & Halsey LLP

(57) ABSTRACT

Multi-channel processing control device and method that efficiently performs enhanced customer service geared to the channel and service characteristics, and that can be readily modified to suit future expansion. A process request generated at a BC controller client (21) is sent as a queue registration request to a dispatcher (32) of a BC controller server (31) via a queue controller DLL (24). In the event of a queue requiring real-time processing, an event transmission and reception unit (25) of the most appropriate client is notified via a BC-BUS (34). A queue not requiring real-time processing is registered at a queue manager (33), where it is managed.

4 Claims, 18 Drawing Sheets

FOREIGN PATENT DOCUMENTS

| | | |
|---|---|---|
| JP | 2002-518890 | 6/2002 |
| WO | WO 95/08236 | 3/1995 |
| WO | WO 98/44714 | 10/1998 |
| WO | WO 99/14920 | 3/1999 |
| WO | WO 99/23806 | 5/1999 |
| WO | WO 99/41720 | 8/1999 |
| WO | WO 99/65214 | 12/1999 |

* cited by examiner

| |
|---|
| Channel Classification |
| Queue Category |
| In/out Category |
| User ID |
| Campaign ID |
| Customer ID |
| History Key |
| Start Date, Time |
| End Date, Time |
| Queue ID |
| Area Code |
| Household Name Identifying Number |
| Individual Name Identifying Number |

Fig.10

| Channel Identification | Channel ID Name |
|---|---|
| 1 | REP |
| 2 | Web |
| 3 | E-mail |
| 4 | CRM |
| 6 | Supervisor |
| 7 | Segment analysis |

Fig.11

| Queue Category | Queue Category Name |
|---|---|
| 1 | In-Effect Callback |
| 2 | No Answer Callback |
| 3 | Follow-Up Call |
| 4 | Campaign |
| 5 | Web Forwarding |
| 6 | e-mail Forwarding |
| 7 | e-mail Transmission (Individual) |
| 8 | e-mail Transmission (Direct Mail) |
| 9 | Phone Call Forwarding |

Fig.12

| Queue classification | Task Request | Delayed notification | Real time notification |
|---|---|---|---|
| In-effect callback | | O | |
| No answer callback | O | | |
| Follow-up call | | O | |
| Campaign | O | | |
| Web forwarding | | | O |
| E-mail forwarding | | O | |
| E-mail sending (individuals) | O | | |
| E-mail sending (direct mailings) | | O | |
| Phone call forwarding | | | O |

Subjects of queue manager acquisition requests

Subjects of dispatcher notification requests

Fig.13

| User ID | Campaign code | Area code | Importance | Forwarding group ID | In-effect flag | In/out classification |
|---|---|---|---|---|---|---|

Fig. 14

| Queue Category |
| --- |
| Task Category |
| Campaign Code |
| Queue Creation Time And Date (for computing hold time) |
| Allocation Logic Number |

Fig.15

| Task Category | Category Name Task Stop Parameter |
|---|---|
| 0 | |
| 10 | CTI Inbound |
| 11 | Potential Sales |
| 20 | CTI Outbound |
| 30 | Tele-banking |
| 40 | e-mail Inbound |
| 41 | e-mail Outbound |
| 50 | Web |
| 98 | Common |
| 99 | Other |

Fig.16

MULTI-CHANNEL PROCESSING CONTROL DEVICE AND MULTI-CHANNEL PROCESSING CONTROL METHOD

BACKGROUND OF THE INVENTION

1. Technical Field

The present invention relates to a multi-channel processing control device and a multi-channel processing control method, for distributing to the most appropriate processing terminals process requests from a plurality of channels, such as process requests originating in calls from public lines or process requests generated by Internet Web servers and e-mail-servers.

2. Description of Related Art

In call centers, the focus is on telephone-based customer response to calls coming in from public lines, and it is common for a number of operators to be standing by before telephones to respond to calls. Channels (i.e., electrical/electromagnetic communication paths) other than as calls from public lines would be those that make use of pre-existing media, such as fax transmission/reception and e-mail direct mail transmission; having operators work dual-duty at these is conceivable.

At call centers whose focus is telephone business, channel control for calls relies on PBX (Private Branch—i.e., on-site—Exchange), and configurations utilizing ACD (Automatic Call Distributor) systems are common.

Recent advances in information technology, centering on the Internet, have opened up for customers new channels in which the World Wide Web and e-mail, for example, are used. Access from customers thus using Internet web servers and e-mail servers can be expected to increase even further with the active use of cellular phones and portable information terminals. This calls for establishing new service providing means, and in response to objectives harmonizing the channels well to realize efficient operations. Further, establishing new customer channels is foreseen for the future, which therefore calls for being able to deal flexibly with the expansion thus into new channels.

In call center systems, in order to keep up with such new channels, a conventional call center will need to made to have functions by which VoIP (Voice Over IP: Internet telephony), the Internet/World Wide Web, e-mail, and portable terminals are harmonized.

However, the characteristics of the various channels are different, and depending on the services provided, the control systems are also different.

SUMMARY OF THE INVENTION

The present invention provides a multi-channel processing control device and a multi-channel processing control method that provide enhanced customer service and efficient operations and that have the flexibility to allow structural changes for future expansion.

The multi-channel processing control device of the present invention comprises: process request determination means for determining whether process requests from a plurality of channels are real-time process requests needing processing in real-time, or whether they are non-real-time process requests, which do not need processing in real-time; real-time processing allocation means for allocating process requests that have been determined to be said real-time process requests to processing terminals currently open among the channels that are capable of that real-time processing; non-real-time processing management means for managing process requests determined to be said non-real-time process requests, as well as their priority; and non-real-time processing allocation means for allocating to any of the processing terminals non-real-time processing managed by said non-real-time processing management means, the allocation performed with consideration given to the priority and the appropriateness of the terminal for handling the processing.

The multi-channel processing control method of the present invention comprises: a step for determining whether process requests generated from a plurality of channels are real-time process requests needing processing in real-time, or whether they are non-real-time process requests not needing processing in real-time; a step, when said process request is determined to be a real-time process request, for allocating those real-time process requests to processing terminals currently open among the channels that are capable of that real-time processing; and a step, when said process request is determined to be a non-real-time process request, for managing that non-real-time process request as well as its priority.

This multi-channel processing control method may further comprise a step for allocating a non-real-time process request currently being managed to the most appropriate processing terminal, based on the priority of the request and the appropriateness of open processing terminals capable of processing that non-real-time process request.

In addition, the present invention proposes a multi-channel processing control method for a processing terminal handled by an operator processing incoming tasks and a processing terminal handled by an operator processing outgoing tasks, wherein at least one of the operators is a dual-duty operator capable of processing either incoming tasks or outgoing tasks, and the processing terminal handled by the dual-duty operator is allocated to either incoming tasks or outgoing tasks depending on the current status of the processing terminals handled by the operators.

Herein, among the processing terminals handled by said each operator, at least one processing terminal is kept open for real-time incoming tasks.

In addition, incoming tasks and outgoing tasks may include process requests generated from such channels as, in addition to the processing terminals handled by each said operator, a web agent that handles process requests generated by Internet web servers, an e-mail agent that handles process requests generated by e-mail servers, and automatic voice response devices that automatically process incoming signals from public lines.

Further, the outgoing tasks may include pre-planned non-real-time process requests that do not require real-time processing.

In addition, the present invention proposes a recording medium on which is recorded a program relating to the above multi-channel processing control. Such recording media may be computer-writable floppy disks, hard disks, semiconductor memory, CD-ROMs, DVDs, and magneto-optic disks.

The present invention further proposes a transmission medium for transmitting the program relating to the above multi-channel processing control. Such transmission media include telecommunications media (optical fiber, wireless circuits, et alia) in computer networks such as LANs, the Internet or wireless telecommunications networks.

From the following detailed description in conjunction with the accompanying drawings, the foregoing and other objects, features, aspects and advantages of the present invention will become readily apparent to those skilled in the art.

BRIEF DESCRIPTION OF THE DRAWINGS

FIG. 10 is a diagram illustrating a queue data table;

FIG. 11 is a diagram illustrating a channel identification list;

FIG. 12 is a diagram illustrating a queue category list;

FIG. 13 is a diagram illustrating relations between queue categories and queue handling;

FIG. 14 is a diagram illustrating an allocation table;

FIG. 15 is a diagram illustrating a priority level table;

FIG. 16 is a diagram illustrating a task category list;

DETAILED DESCRIPTION OF THE PREFERRED EMBODIMENTS

Configurational Outline

Figure 1:
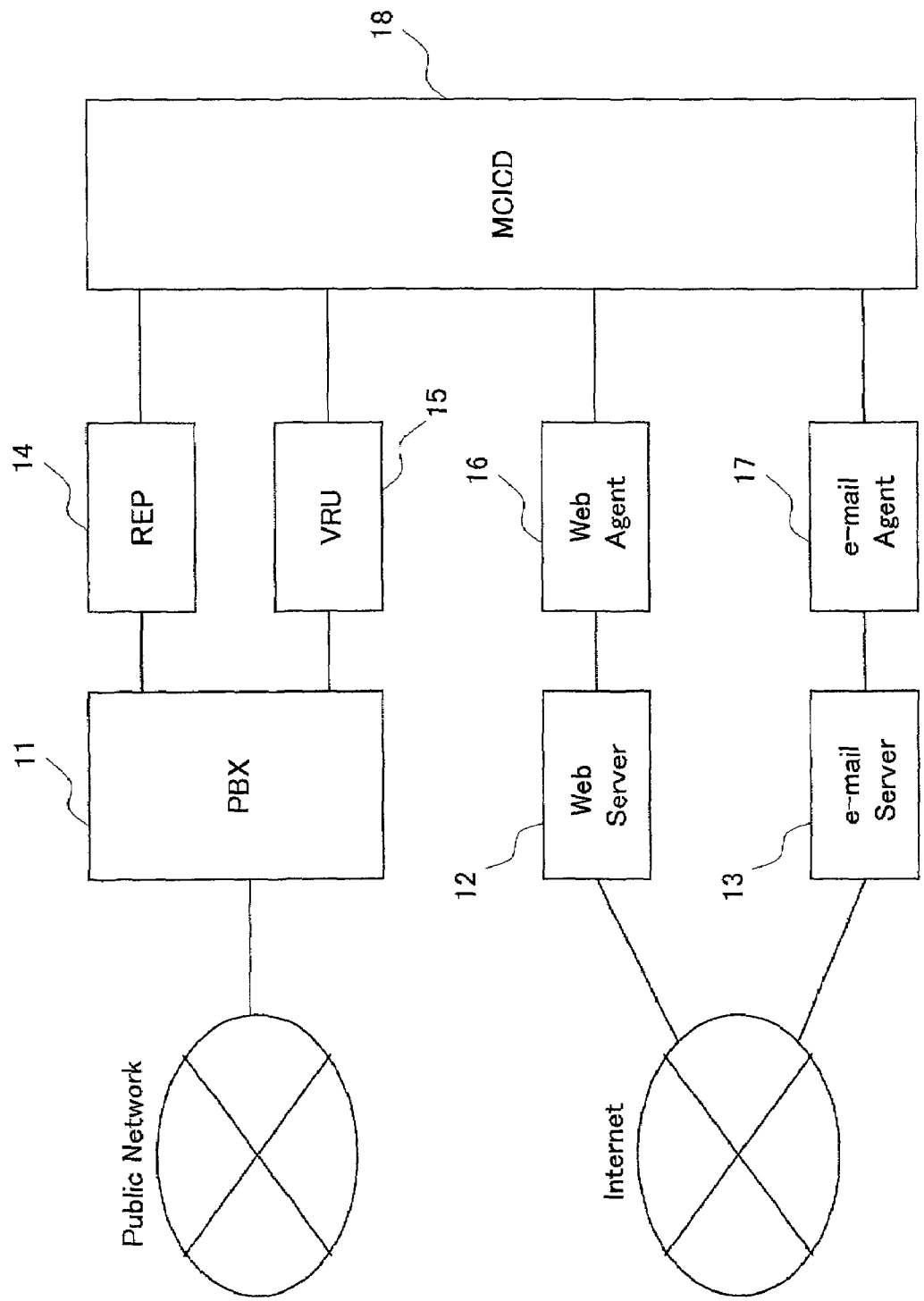
FIG. 1 is a simplified block diagram showing an example of a configurational outline.

FIG. 1 shows a configurational outline of a call center employing one embodiment of the present invention.

The call center shown here comprises a PBX (private branch exchange) 11 connected to a public network, a Web server 12 connected to the Internet, and an e-mail server 13. The PBX 11 is connected to a REP 14, which is an operator terminal operated by an operator, and a VRU (voice recognition unit) 15. The Web server 12 is connected to a Web agent system 16, and the e-mail server 13 is connected to an e-mail agent system 17.

The REP 14 and VRU 15 are devices for providing a primary portal for incoming calls from the public network to the PBX 11. The Web agent system 16 is a device for providing a primary portal when there have been requests from the Internet to the Web server 12, and the e-mail agent system 17 is a device for providing a primary portal when there have been requests from the Internet to the e-mail server 13.

The REP 14, the VRU 15, the Web agent system 16, and the e-mail agent system 17 are each connected to an MCICD (multi-channel intelligent call distributor) 18. The MCICD 18 manages all process requests generated in each channel, and forwards the process requests to the most suited processing terminal.

The MCICD 18 is notified asynchronously by the various channels of requests from customers; for those requests for which automatic response in the channel is possible, automatic response is performed. For those requests for which automatic response in the channel is not possible, the MCICD 18 is notified by that channel of a process request. In the MCICD 18, a routine is carried out that considers various parameters for the process requests from the channels, finally to forward the requests to the REP 14.

The REP 14 is constituted by an operator terminal, is capable of telephone-based call processing as well as e-mail processing, and is configured to enable executing process requests from all channels by operator operations.

Figure 2:
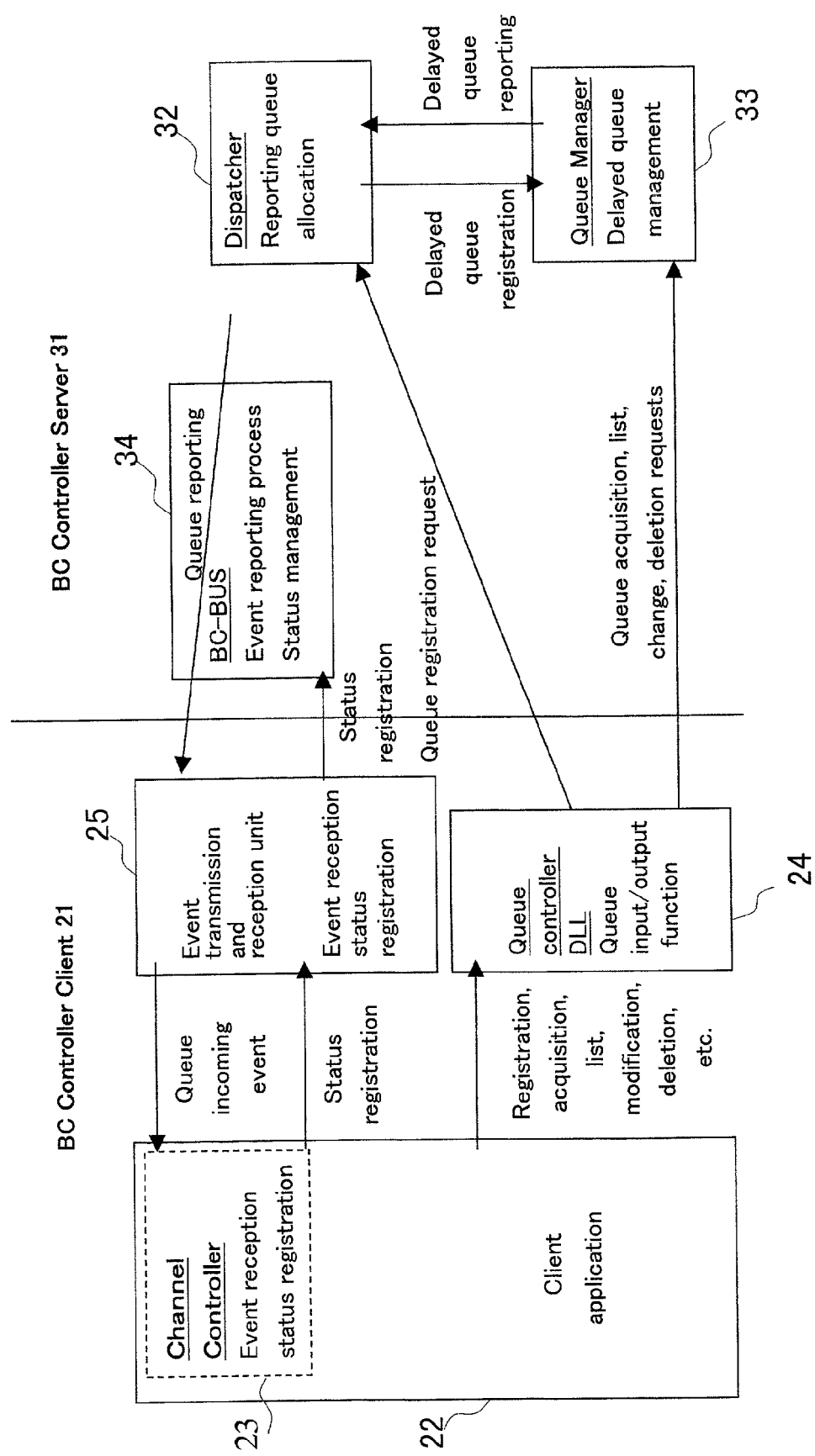
FIG. 2 is a control block diagram showing a interior configuration.

FIG. 2 shows the configuration of the MCICD 18.

The MCICD 18 comprises a BC controller client 21 disposed on the end with the channels—the REP system 14, VRU 15, Web agent system 16 and e-mail agent system 17—and a BC controller server 31 that exercises general control over the clients.

A client application 22, a queue controller DLL 24, an event transmission and reception unit 25 and associated components are disposed on the client end. The BC controller client 21 comprises the queue controller DLL 24 and the event transmission and reception unit 25.

The event transmission and reception unit 25, via a channel controller 23 within the client application 22, performs input and output of the current status of the clients and queue reports sent from the servers. For example, the event transmission and reception unit 25 procures the current status of the clients from the channel controller 23, which it transmits to the servers. It also receives queue reports sent from the servers, which it sends to the channel controller 23.

The queue controller DLL 24 also sends to the servers requests generated by client application 22 such as queue registration requests, queue acquisition requests, queue list requests, and deletion requests.

The BC controller server 31 comprises: a dispatcher 32 that receives queue registration requests sent from the queue controller DLL 24 and allocates this queue data; a queue manager 33 that manages non-real-time process requests (delayed queue) that do not require processing in real-time; and a BC-BUS 34 that administrates current status sent from the client end, based upon which it sends queuing reports, or events to the client end.

The dispatcher 32, when there is a queue registration request from the queue controller DLL 24, determines whether this is a real-time process request requiring processing in real-time, or whether it is a non-real-time process request that does not require real-time processing. If the queue registration request is a real-time process request, a channel capable of this processing is selected, and, based on the status of the clients managed by the BC-BUS 34, a queue report is sent to the event transmission and reception unit 25 of the most appropriate client. If the queue registration request is a non-real-time process request, this queue data is registered in the queue manager 33 as a delayed queue.

The BC-BUS 34 administrates current status sent from the client end, and transmits, based on the current status of the clients it administrates, queuing reports sent from the dispatcher 32 to available clients.

The queue manager 33 registers and manages queue registration requests that the dispatcher 32 has determined to be non-real-time process requests, as well as their priority. The queue manager 33 also manages outbound tasks such as carrying out promotions to target pre-sampled customers, by registering the tasks one by one as delayed queues. With this type of outbound task, in response to a queue acquisition request from a client, the queue with the highest priority, based upon the request content, is selected, and this queue is returned to the client. The client processes the acquired queue. If there is a queue deletion request after the client has completed processing of the delayed queue managed by the queue manager 33, the corresponding delayed queue is deleted. If a callback is necessary, a callback queue is registered.

The queue manager 33 monitors the delayed queues that it manages, and when there is a delayed queue that satisfies a set of parameters, it notifies the dispatcher 32 of this fact. For example, if there is a delayed queue for which a set length of time has passed since it was registered, or if there is a queue acquisition request from a client and there is a delayed queue registration that satisfies the requested parameters, a queue that matches those parameters is selected and returned to the client. When there are from a client such requests as a queue list request, a change request, or a deletion request, a corresponding delayed queue data list is sent to the client, and changes or deletions of the delayed queue data are performed.

Queue Registration Request

Requests that can be responded to automatically in a channel are processed in the channel. For example, a telephone call arriving through a public line is automatically allocated to the REP system 14 or the VRU 15 by an ACD system within the PBX 11, and either the operator handling the REP 14 responds or the VRU 15 performs an automatic response process. In the event of requests for which it appears that response by an operator or the VRU 15 would be insufficient, a queue registration request is sent to the servers via the queue controller DLL 24.

For response to inquiries that are sent to the Web server 12 or to e-mail sent to the e-mail server 13, the Web agent system 16 or the e-mail agent system 17, respectively, sends a queue registration request to the servers via the queue controller DLL 24.

Figure 3:
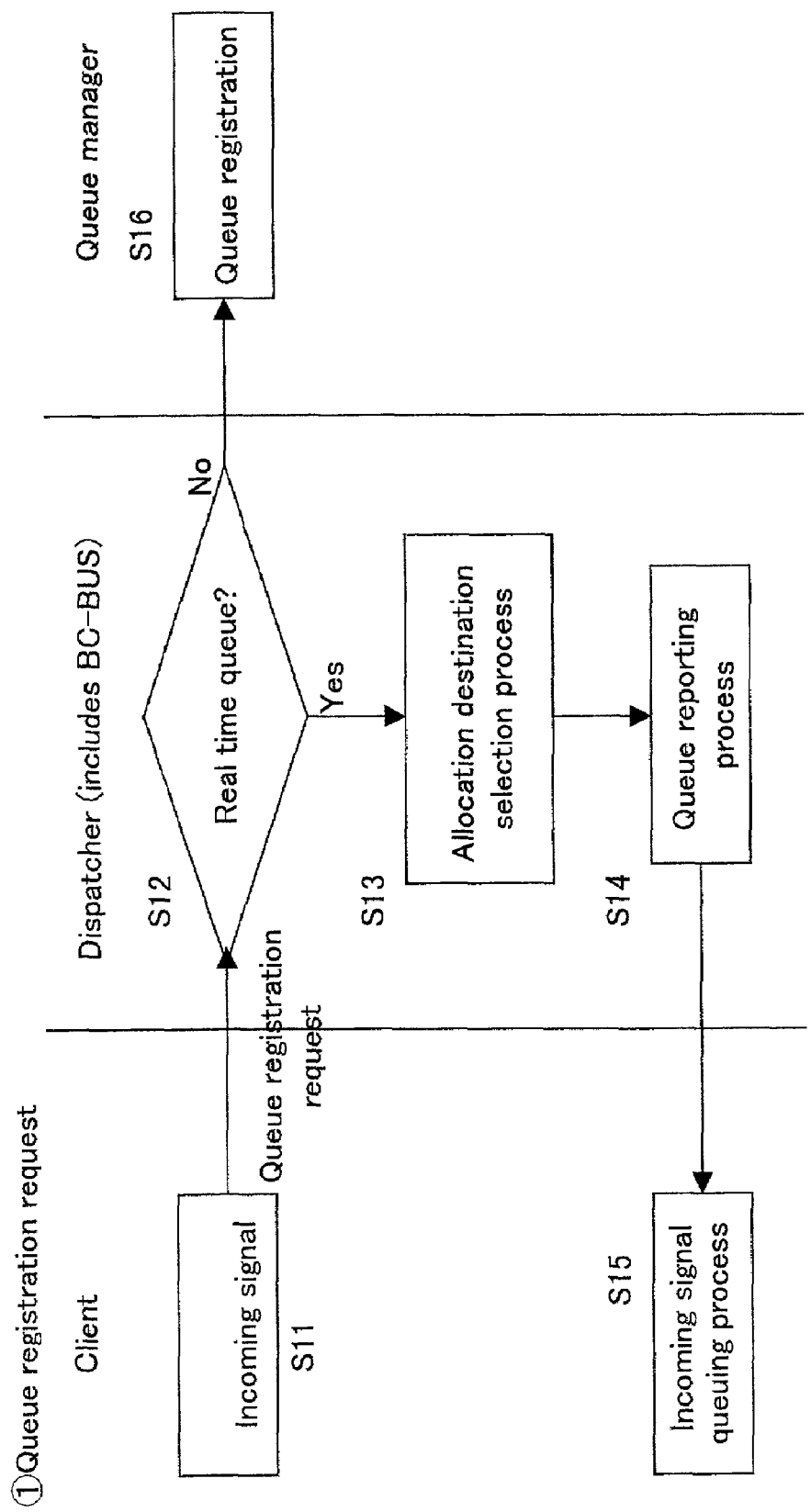
FIG. 3 is a flowchart of a queue registration request process.

Thus when a process request is arises in the channels, a queue registration request process is executed, according to a flowchart as shown in FIG. 3.

In step S11, when the queue controller DLL 24 has determined that the received request cannot be processed by a client, it makes a queue registration request to the dispatcher 32 of the BC controller server 31. Then the queue controller DLL 24 creates queue data corresponding to the request, and sends this to the dispatcher 32.

The queue data constitutes a table such as is shown in FIG. 10, provided with items including Channel Type, Queue category, In/Out Classification, User ID, Campaign ID, Customer ID, History Key, Start Time and Date, Completion Time and Date, Queue ID, Area Code, Household Name Identifying Number, and Individual Name Identifying Number.

Channel classes include, for example as set forth by numerical value in the channel identification list of FIG. 11: REPS, which are operator terminals; Web agents; e-mail agents; CRM (Customer Relationship Management) agents; supervisors, who manage the operators; and segment analysis, which extracts customers targeted for outbound tasks. When the number of channel classes needs to be expanded, this channel identification list may be modified as needed.

Queue categories include, for example as shown in the queue category list of FIG. 12 according to numerical value: Effective Callbacks, which are callbacks to customers that are to be made based on the results of an earlier telephone conversation with the client; No Answer Callbacks, which are callbacks to customers who were not in or whose lines were busy; Follow-Up Calls, which follow up on previous calls; Campaigns, which are outbound tasks performed by telephone; Web Forwarding, which are requests for callbacks to the Web server; e-mail Forwarding, which are responses to e-mail; e-mail Transmission (Individual), which is transmission of individual items of e-mail; e-mail Transmission (DM), which is for direct mailings, and Telephone Call Forwarding, which forwards calls to the most appropriate operator. These queue categories may be modified as needed, based on changes in channel classes and changes in the system.

The in/out category indicates whether a queue is an inbound task or an outbound task. The user ID is an identification number for the operator or terminal handling the queue. The campaign ID and the customer ID can be identified from such sources as the customer data input from the operator terminal when an operator answers a phone call, the ID number that a customer has input on a Web site, and the mail address contained in the e-mail. In the case of outbound tasks, data is input on customers that are selected when a promotion is being planned.

The queue ID may be constituted so that the dispatcher 32 automatically assigns a number when it receives a queue registration request. The area code is established for each customer, and can be identified through a customer's address and mail address type. The household name identifying number is used when there are customers in a single household for whom simultaneous processing is possible, and the individual name reference number is used when simultaneous processing for an individual is possible.

In Step S11, the queue data sent from the queue controller DLL 24 to the dispatcher 32 is: when a queue registration request that issues from the REP 14 and the VRU 15, queue category "9: Call Forwarding"; when a queue registration request that issues from the Web agent system 16, the queue category "5: Web Forwarding"; and when a queue registration request that issues from the e-mail agent system 17, the queue category "6: E-mail Forwarding."

In Step S12, the dispatcher 32 distinguishes whether a queue registration request sent in is a real-time queue requiring processing in real-time or a delayed queue not requiring processing in real-time.

The determination of whether the queue registration request is a real-time queue or a delayed queue can be made according to the queue data queue category in which there has been a queue registration request. For example, as shown in FIG. 13, if the queue category is "No Answer Callback," "Campaign," "E-mail Sending (DM), the queue is a task request queue. If the queue category is "Effective Callback," "Follow-up Conversation," "E-mail Forwarding," or "E-mail Sending (Individual)," the queue is a delayed notification queue. If the queue category is "Web Forwarding," "Telephone Forwarding," the queue is the real-time notification queue. Allotment into real-time process requests or non-real-time process requests is in accordance with the services set in the queue categories; settings for real-time process requests and non-real-time process requests can be made flexibly.

The real-time notification queue is a process request requiring real-time processing. The real-time queue is used, for example, for callback requests to the Web server 12 or for the forwarding of telephone calls that the REP 14 or the VRU 15 were unable to process.

The task request queue relates to outbound tasks, such as no answer callbacks to customers who were not in or whose lines were busy, campaigns that are outbound tasks performed with the telephone, and e-mail transmission (DM) for direct mailing. The task request queue is sent to clients according to a queue acquisition request from the queue controller DLL 24. The delayed notification queue is for tasks such as: the effective callbacks, which are to customers who require a callback based on the results of a previous call; telephone calls to follow up on previous calls; e-mail forwarding for responses to e-mail; and e-mail transmission (individual) for sending of individual e-mail. The task request queue and delayed notification queue are delayed queues; when the dispatcher 32 receives these queue registration requests, it sends them to the queue manager 33, which performs registration and management. While delayed notification queues do not require real-time processing, they are considered to require processing within a set time frame, with a response needed to a request from a customer. Therefore, after a predetermined time elapses following registration by the queue manager 33, a queue report is given to the dispatcher 32, and the dispatcher 32 performs the allocation.

In Step S12, if it is determined that the queue data for which there was a queue registration request is a real-time queue, control proceeds to Step S13. At Step S13, the allocation destination for the real-time notification queue is selected.

The allocation of the real-time notification queues can be performed using an allocation table as shown in FIG. 14. This allocation table may, for example, be created for each operator, based on the queue data that each operator of the REPs 14 is capable of handling. The table contains such items as User ID, Campaign Code, Area Code, Importance, Forwarding Group ID, In-effect Flag, and In/Out Classification.

The user ID is the ID number of the operator. Campaign codes, area codes and the like are established that are associated with this user ID and that the operator can handle. The system may be constituted so that an operator handles a plurality of campaign codes or area codes, depending upon the skill of the operator. Depending on circumstances the system may also be constituted so that the importance of an operator may be set. Also, allocation information (entries) is divided into those for inbound tasks and those for outbound tasks. The system may be constituted so that when a call is received from a public network, a multi-logon function of the ACD system provided in the PBX 11 confirms the customer's campaign code, area code and the like when the call is received, and automatically allocates this call to an operator with a matching campaign code or area code. The dispatcher 32 selects the most appropriate operator for real-time process requests generated in the channels.

The dispatcher 32 compares the real-time notification queue ID, area code, and in/out classification with the real-time notification queue ID, area code, and in/out classification of the operators, and selects an operator who can handle this real-time notification queue. As a rule, an operator whose in/out classification matches and who has a matching campaign code is selected. When an area code is designated, particularized allocation in which area code is included is performed.

After the allocation destination is selected, in Step S14, when selecting the terminal to which a queue report is to be made, a decision is made based on the available status of the terminals, and the notification is sent. At this time, if there is no terminal open, a busy notification will be sent to the originator of the request, indicating that at present response is not possible, even if the request is a real-time process request. If the request is a non-real-time process request, then the request is returned to the queue manager, and is processed again during the next reporting process.

Receiving a queue reporting process from the dispatcher 32, on the client end, in Step S15, a queue incoming signal process is carried out. Herein queue data sent from a server is acquired and response is made to the real-time reporting queue. This actually means that an operator makes a telephone response or e-mail response.

When real-time notification queue handling is possible in channels other than those REPs handled by operators, terminals for such channels are selected, real-time notification queue are sent thereto, where processing is performed. Modifications may be made as needed as the channels are expanded.

In Step S12, a routine is carried out for registering as delayed queues on the queue manager 33 process requests which the dispatcher 32 has determined not to be real-time queues. Herein the queue manager 33, in Step S16, registers that process request as a delayed queue. The registration of delayed queue requests may include an outbound task queue being registered through the segment analysis channels; therein, registration of the delayed queues as task request queues is made.

In registering delayed queues, the registration process priority level is assigned to each queue. The priority level of each queue is established according to a priority table, as shown in FIG. 15.

The queue priority table is made up of queue category, task category, campaign code, queue creation date and time, and allocation logic items.

Queue category is the queue class belonging to given data, and is established by the queue categories shown in FIG. 12. Task category indicates the form of contact with the customer; as listed in FIG. 16 by numerical value, tasks are classified for example into: Task Stop Status, CTI Inbound, Potential Sales, CTI Outbound, Tele-banking, E-mail Inbound, E-mail Outbound, Web, Common, and Other categories. These task categories may simply indicate inbound categories, or they may indicate whether the task is inbound or outbound.

The campaign code in the queue priority table can be acquired from the campaign ID in the queue data. For the queue generation date and time, which is for monitoring time elapsed since registration of queue data, the time of registration is established.

The allocation logic is the search logic applied to a queue. For example, allocation logic ID numbers are prepared beforehand for searching for requests for which a predetermined length of time has elapsed since the queue generation time; for searching for requests that have a matching campaign code; for searching only for queues for outbound tasks; for searching for requests for callbacks; searching for requests with matching operator IDs; searching for requests with matching area codes; or searching through a combination of the above.

Queue Acquisition Requests

Figure 4:
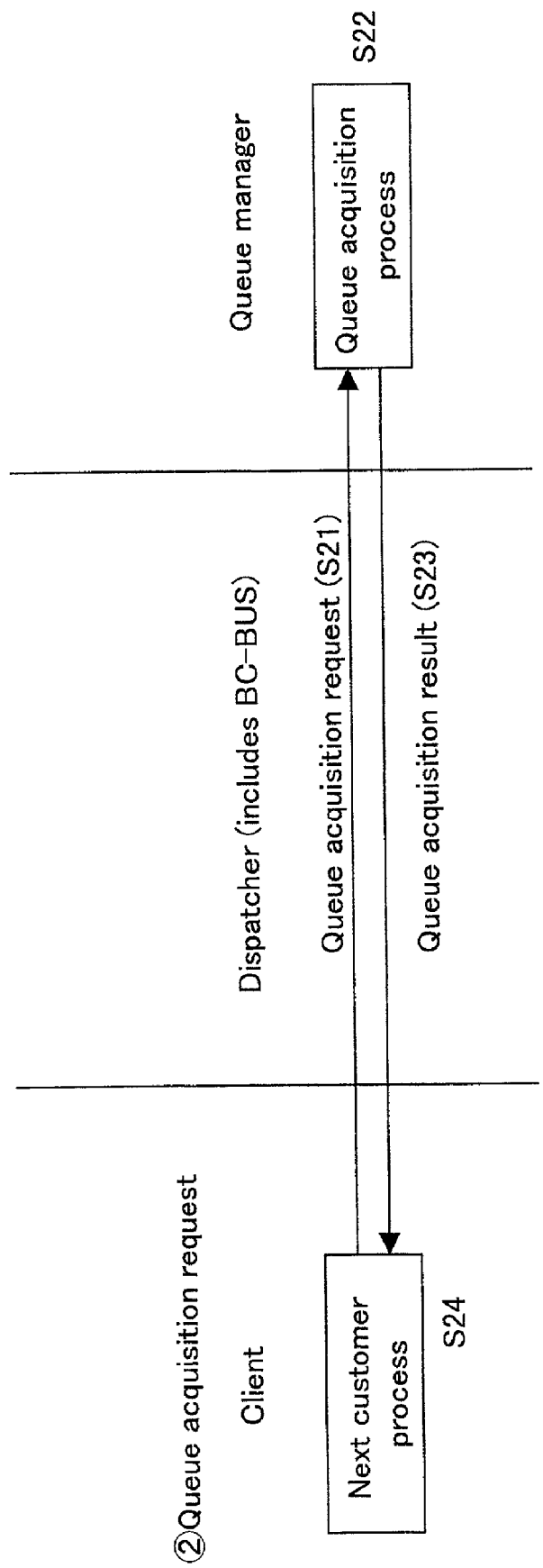
FIG. 4 is a flowchart of a queue acquisition request process.

When a delayed queue acquisition request has been made from the client end, a process is executed according to the flowchart shown in FIG. 4.

Some conceivable cases in which a delayed queue acquisition request would be made from the client end would be in outbound tasks such as preplanned promotion-related tasks, and in delayed notification queue processing, wherein a queue for performing a next-customer process would be requested on the client end.

When a client that has become available and able to execute processing for a next customer requests next queue data, the client sends a queue acquisition request from the queue controller DLL 24 to the queue manager 33 (Step S21). The queue acquisition request sends the requested queue category, campaign ID, in/out classification and operator user ID, as well as data requesting the next customer data.

When the queue manager 33 receives the queue acquisition request from the client, it executes a queue acquisition process in Step S22. In the queue acquisition process, the registered delayed queue is searched and queue data for the next customer is extracted, based on the queue categories, campaign IDs, in/out classifications, and area codes in the sent data.

The queue manager 33 then sends to the client the next customer queue data that has been extracted, which is identified by its user ID (Step S23). On the client end the process for the next customer is executed (Step S24) based on the sent queue data.

This configuration may be such that in the queue acquisition request of Step S21, the client sends only the operator's user ID, and in Step S22 the queue manager 33 would extract the appropriate queue based on this user ID and send that queue data.

Queue List Request

Figure 5:
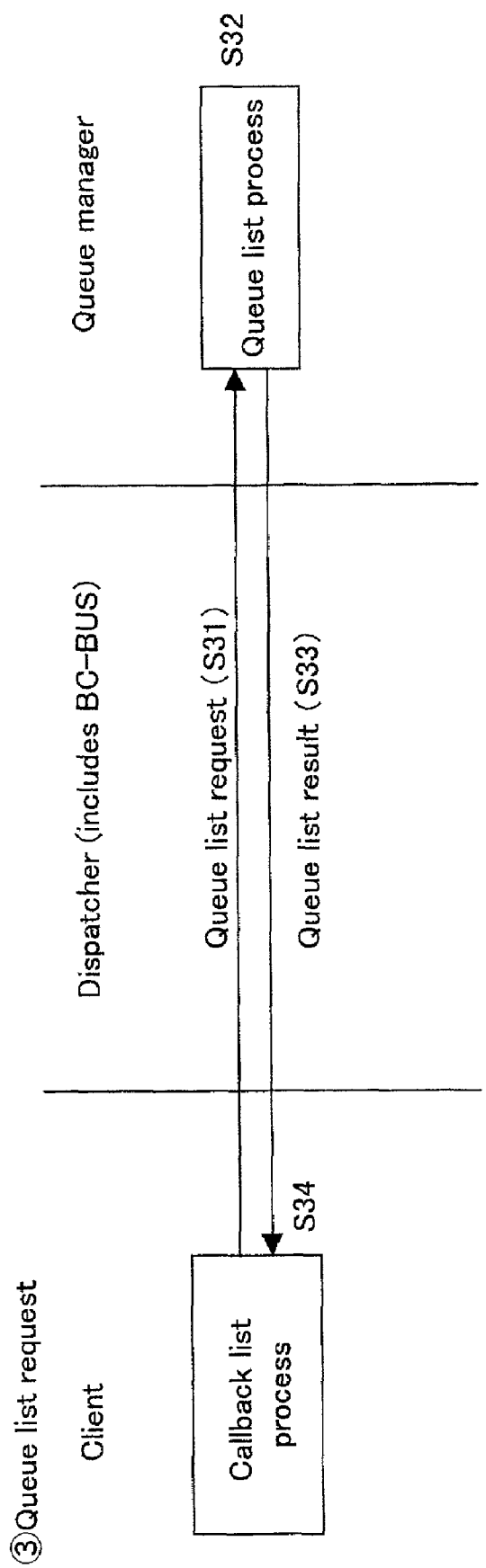
FIG. 5 is a flowchart of a queue list request process.

When a client requests a queue list registered in the queue manager 33, processing is executed according to the flowchart shown in FIG. 5. Conceivable cases in which a client will make a queue list request include, for example, an operator wishing to see, from among the delayed queues registered in the queue manager 33, a list of queues for which the queue category is "effective callback."

When a client makes a queue list request, the queue controller DLL 24 sends the queue list request to the queue manager 33 (Step S31). Here, the sent data may include the queue category, campaign ID, operator's user ID and the like for the queues for which a list was requested.

The queue manager 33, having received the queue list request, creates a queue list based on the sent data (Step S32). For example, based on the queue category, campaign ID, and user ID, it searches the registered delayed queues, extracts the queue data that matches the request from the client, and creates list data.

The queue manager 33 sends the list data thus extracted and created to the client, which is identified by its user ID (Step S33). The client, having received the sent list data can execute a listing process by such means as displaying the list data as a list on a monitor (Step S34).

Queue Change Request

Figure 6:
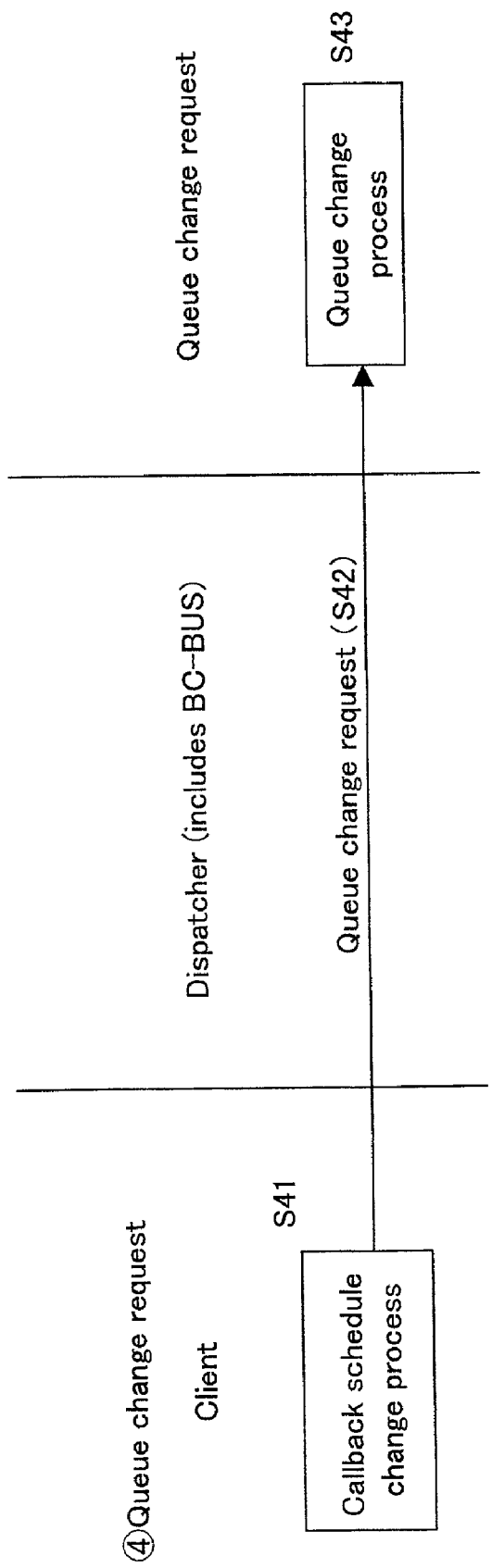
FIG. 6 is a flowchart of a queue change request process.

When a request is made to change queue data for a delayed queue registered with the queue manager 33, a routine is executed according to the flowchart shown in FIG. 6. Conceivable cases in which a queue change request would be made include changing the time of a callback for those queues among the delayed queues managed by the queue manager 33 that have "effective callback" as their queue category.

When a data change is carried out on the client end on the delayed queues managed by the queue manager 33, as when there has been a change in a scheduled callback (Step S41), the queue change request is sent to the queue manager 33 (Step S42). The queue change request sends queue IDs and user IDs, as well as data for making the change.

The queue manager 33, based on the sent data, extracts queue data having the designated queue ID, and makes the queue data reflect the data change.

A configuration is possible such that, if on the client end the queue ID of the queue data to be changed cannot be recognized, data on queue categories, area codes and start times is sent, and the queue manager 33 is made to search for the relevant queue data.

Queue Deletion Request

Figure 7:
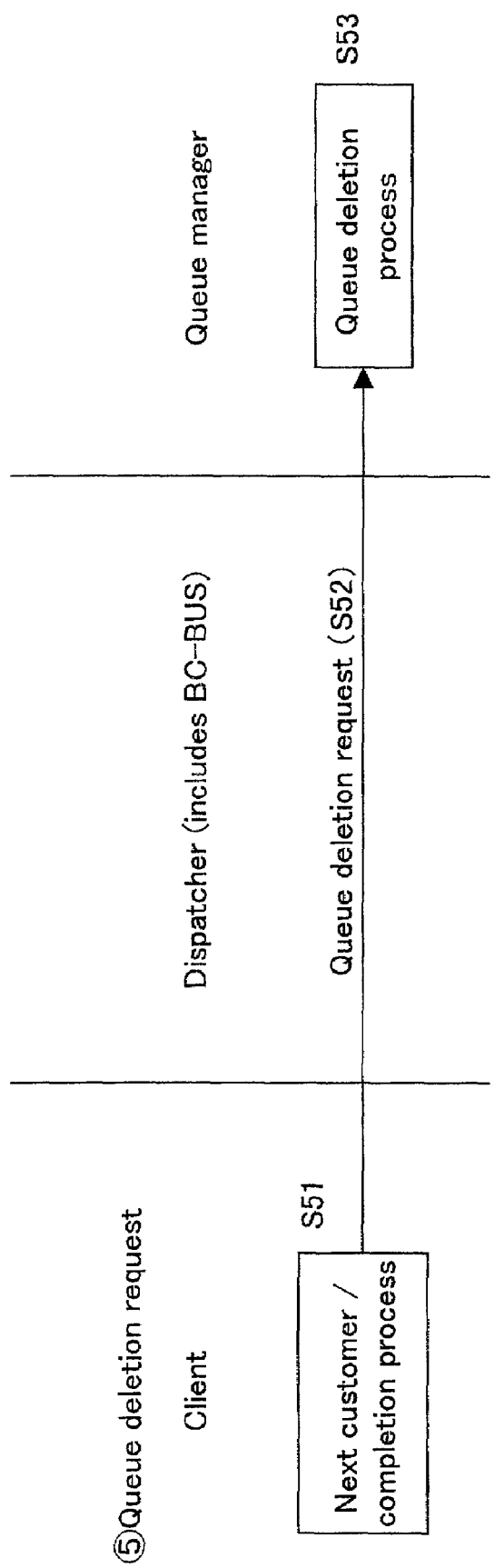
FIG. 7 is a flowchart of a queue deletion request process.
Figure 8:
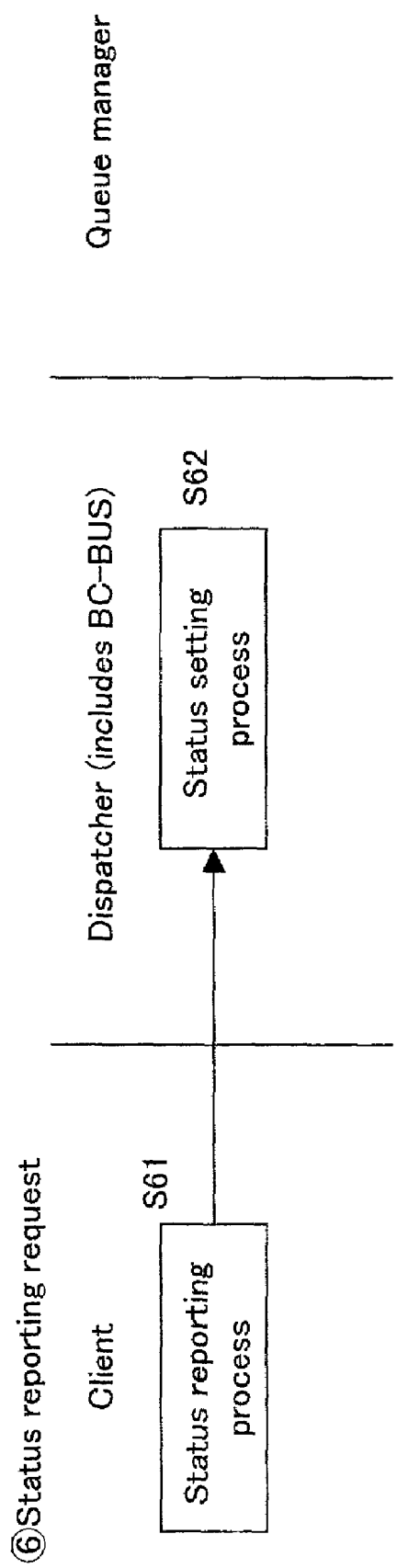
FIG. 8 is a flowchart of a status reporting process.

When a request is made to delete queue data in the delayed queues registered with the queue manager 33, a routine is executed according to the flowchart shown in FIG. 7. Conceivable cases in which a queue deletion request would be made include the deletion of queues from those under the management of the queue manager 33 because the processing of queues acquired from the queue manager 33 has been completed.

When a queue deletion request is made at a client, as when the next customer processing acquired from the queue manager 33 has been completed (Step S51), the queue deletion request is sent to the queue manager 33 (step S52). The queue deletion request is constituted so as to send such data as the queue ID of the queue data, completion time and date, and the operator's user ID.

When the queue manager 33 receives the queue deletion request from a client, it a executes queue deletion process (step S53). In the queue deletion process, queue data is extracted based on the queue ID in the sent data, a process-completed flag is raised or some such similar step taken, and this queue data is deleted from the active delayed queues.

Status Notification Process

A client notifies the server side of its current status, namely, whether it is currently executing some process (Step S61). Conceivable current statuses include available status, wherein no process is being executed, and busy status, wherein some process is being executed. When there is a change is the current status of a client, the client application 22 recognizes this change and sends current status data to the event transmission and reception unit 25 via the channel controller 23. The event transmission and reception unit 25 sends this current status data to the BC-BUS 34 of the BC controller server 31, thus completing the status notification process.

The BC-BUS 34, based on the current status data sent from the client, executes a status-setting process by changing the relevant client status data from among the status data that it manages (Step S62).

Delayed Queue Reporting Process

When a delayed queue managed by the queue manager 33 fulfills a predetermined parameter or set of parameters, the dispatcher 32 is notified of this, and the dispatcher 32 allocates this queue to the most appropriate client. Scheduling the time and date for the next processing for delayed queues managed by the queue manager 33 that have "effective callback" as their queue category is conceivable. Delayed queues for which the queue category is follow-up call, e-mail forwarding, and e-mail transmission (individual) do not require real-time processing; however, because they involve response to customers, they should be processed relatively quickly. The delayed queue reporting process is executed in cases where the scheduled time and date of a delayed notification queue have arrived, such as when the queue category is "effective callback," and in cases where a predetermined length of time has passed since delayed queue reporting registration, such as when the queue category is follow-up call, e-mail forwarding, or e-mail sending (individual).

Figure 9:
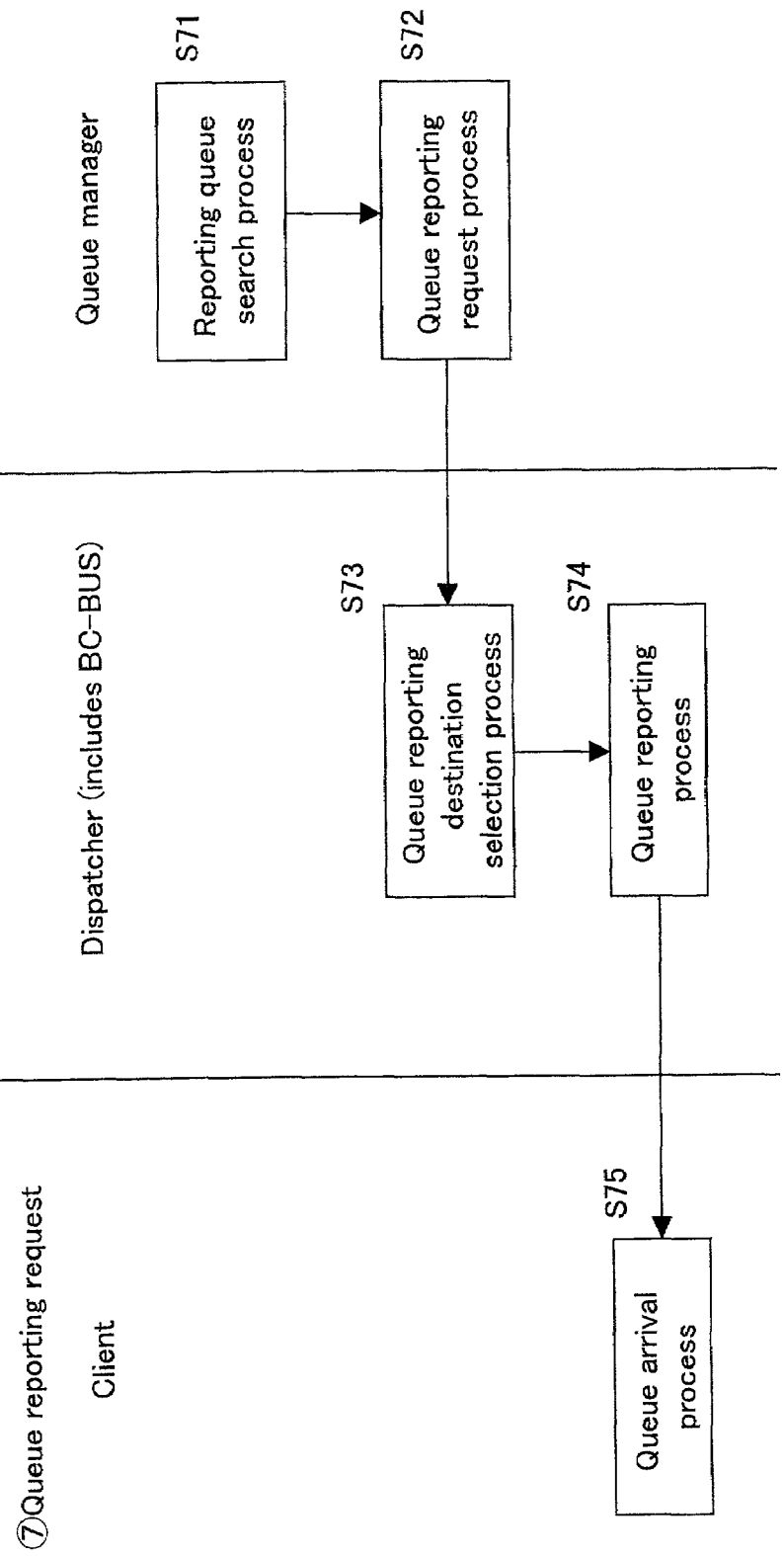
FIG. 9 is a flowchart of a delayed queue reporting process.

This delayed queue reporting process will be explained using the flowchart of FIG. 9.

In Step S71, the queue manager 33 searches the registered delayed queues using allocation logic and extracts, for example, delayed notification queues for which a predetermined amount of time has passed since registration, or "effective callback" queues for which the scheduled date and time have arrived. Herein, searches of registered delayed queues are performed at periodic intervals, and when a corresponding item is found, control proceeds to Step S72.

In Step S72, the delayed notification queue extracted as a result of the search at Step S71 is sent to the dispatcher 32, and a delayed queue reporting request is made. At this point, such data of the extracted queue data as queue category, in/out classification, user ID, campaign ID, customer ID, start time, area code is sent to the dispatcher 32.

In Step S73, the dispatcher 32 selects a queue reporting destination based on the sent data. The in/out classification, campaign ID, area code and the like is compared against the allocation table of each operator, and the most appropriate operator is selected. For queues that have a valid ID, the operator with that user ID is selected. When the client current status managed by the BC-BUS 34 indicates that the selected client is busy, re-selection is executed. The system may be constituted so that in the event that a plurality of operators is capable of processing this queue, the operator that has waited the longest to receive a signal is given notification of the queue.

When a queue reporting destination is identified in Step S73, a queue reporting process is executed in Step S74. The queue reporting process executes the sending of queue reports via the BC-BUS 34 to the event transmission and reception unit 25 for the client corresponding the selected operator. Here, such information as the queue data's queue category, in/out classification, user ID, campaign ID, customer ID, start time and date and area code is sent.

In Step S75 the client executes queue incoming signal process based on the sent data. For example, the system may be constituted so that the queue information that has arrived is displayed on a monitor, which prompts the operator to execute the process.

REP Screen Transitions Figure

Figure 17:
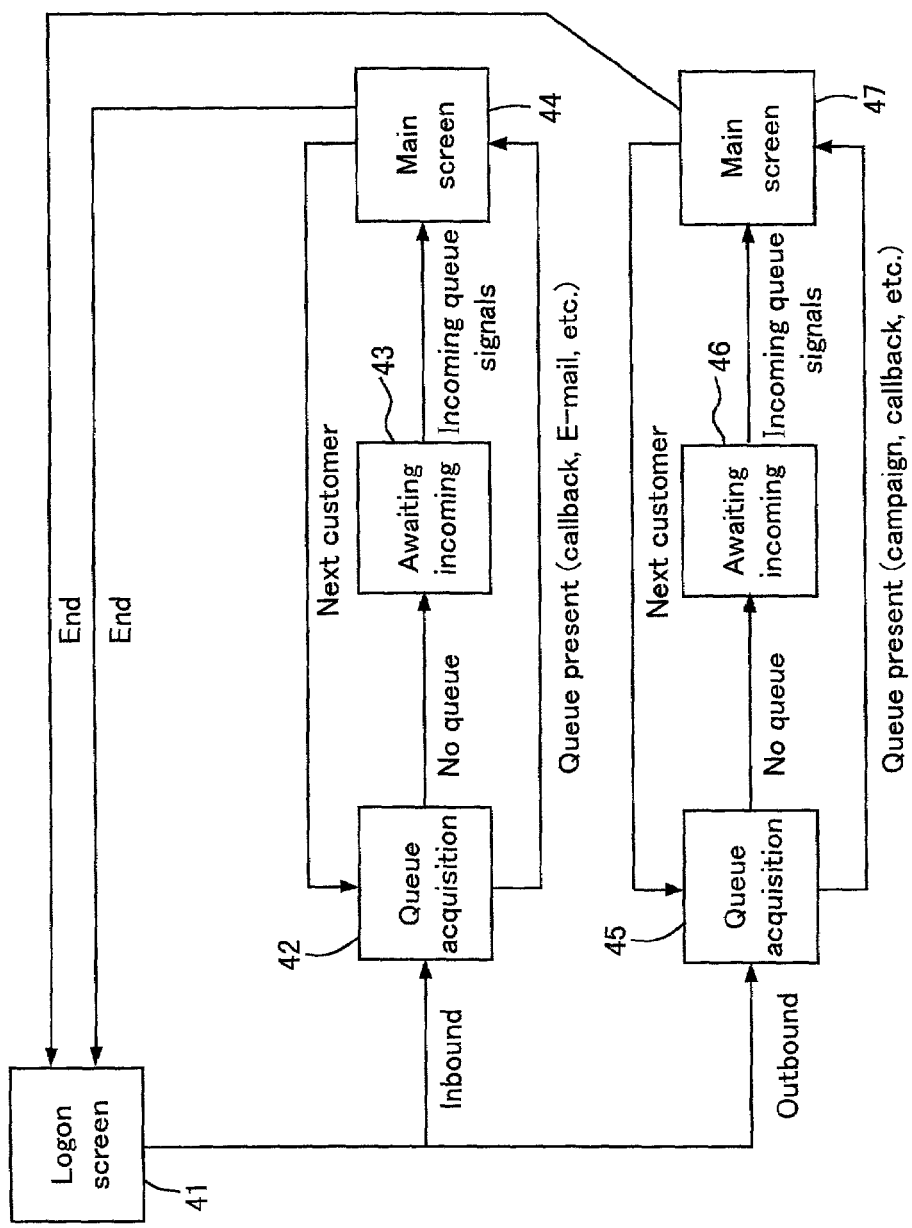
FIG. 17 is a diagram illustrating REP screen transitions.

Based on FIG. 17, explanation will be made of screen transitions on the REP 14 operated by an operator.

First, when the client application 22 is started up, a Logon screen 41 appears. The Logon screen 41 allows for selection of inbound task and outbound task as well as logging on. Normally, by selecting a task preset by the operator and logging on, the screen shifts to inbound system processing screens or outbound system processing screens.

The inbound system processing screens comprise a Queue Acquisition screen 42, an Awaiting Incoming Signal screen 43, and a Main screen 44. When callbacks or e-mail processes are executed, the Queue Acquisition screen 42 is used to make a queue acquisition request to the queue manager 33. When, during reception of a telephone calls, items in the "effective callback," follow-up call, and e-mail forwarding queue categories are processed, the queue acquisition request is carried out, and the queue is acquired from the queue manager 33.

In the event that among the delayed queues registered with the queue manager 33, none exists that corresponds to the queue acquisition request, the Awaiting Incoming Signal screen 43 ensues. The Awaiting Incoming Signal screen 43 is configured give notification that a phone call from a public network, a queue report sent from the BC controller server 31, or other such queue has arrived. When a queue has arrived, the Main screen 44 ensues.

In the Queue Acquisition screen 42, too, if a delayed notification queue corresponding to the queue acquisition request exists, there is an appropriate queue report from the BC controller server 31, and the Main screen 44 ensues.

The Main screen 44 displays data pertaining to the queue, and by such means as starting up the required application, displays a screen corresponding to the relevant process. When the process is completed and the next customer queue is to be acquired, the screen switches from the Main screen 44 to the Queue Acquisition screen 42, and queue acquisition is performed. When the operator logs off the Main screen 44, the processes on the Main screen 44 are completed and the Logon screen 41 ensues.

Also, a process may be carried out that, without the Queue Acquisition screen 42 being displayed, monitors for an operator terminal in available status and acquires and allocates the queues automatically. Herein, the system configuration may be such that the time from termination of an operator process to the next queue allocation process is measured, and if more than a given time has elapsed, the queue is automatically acquired from the queue manager and allocated to the operator terminal.

The outbound system processing screens comprise a queue acquisition screen 45, a awaiting incoming signal screen 46 and a main screen 47. When executing such processes as campaigns, callbacks and direct mail e-mail, the queue acquisition screen 45 is used to make a queue acquisition request to the queue manager 33. When process request queues such as those for which the queue category is no answer callback, campaign, e-mail sending (DM), the queue acquisition request therefor is made, and the queue is acquired from the queue manager 33.

In the event that among the delayed queues registered with the queue manager 33, none exists that corresponds to the queue acquisition request, the screen changes to the awaiting incoming signal screen 46. The awaiting incoming signal screen 46 is constituted so as to give notification that a queue report sent from the BC controller server 31, or other such queue has arrived. When a queue has arrived, the screen changes to the main screen 47.

In the queue acquisition screen 45, too, if a request queue corresponding to the queue acquisition request exists, there is an appropriate queue report from the BC controller server 31, and the main screen 47 ensues.

The main screen 47 displays data pertaining to the queue, and by such means as starting up the required application, displays a screen corresponding to the relevant process. When the process is completed and the next customer queue is to be acquired, the queue acquisition screen 45 ensues from the main screen 47, and queue acquisition is performed. When the operator logs off the main screen 47, the processes on the main screen 47 are completed and the Logon screen 41 ensues.

Working Model

Figure 18:
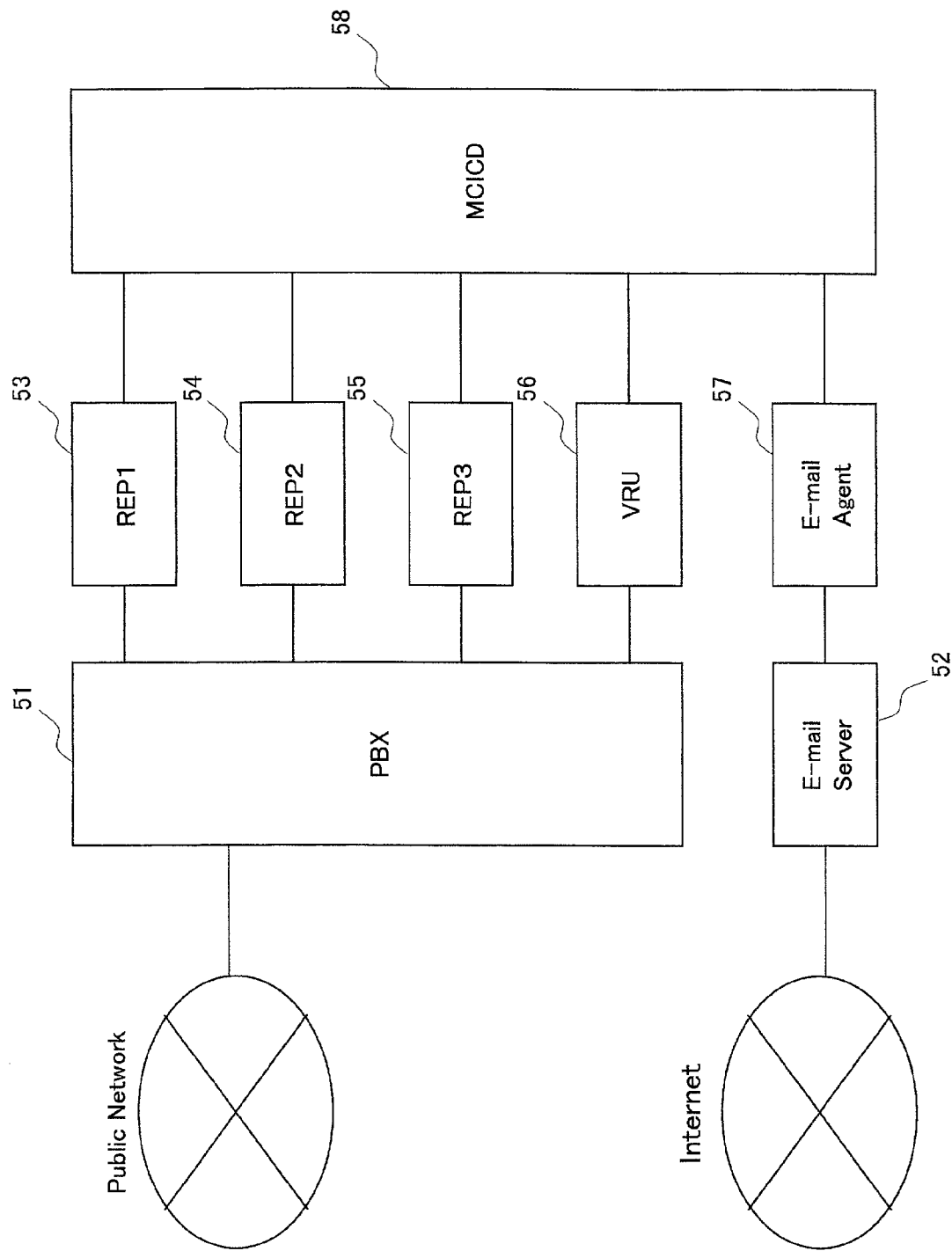
FIG. 18 is a block diagram showing an example of a working model.

As an illustration of how the system actually operates, an explanation will be given of an example of the actions at a call center performing response by phone and e-mail, using the structural diagram FIG. 18.

In the configuration herein, a PBX 51 connected to a public network and an e-mail server 52 are provided, the PBX 51 being connected to the three REPs 53, 54 and 55 and to one VRU 56, and the e-mail server 52 being connected to one e-mail agent 57. The REPs 53, 54 and 55, the VRU 56 and the e-mail agent 57 are connected to the MCICD 58, and queues based on received signals and promotions are controlled by the MCICD 58 and allocated to the various channels.

The first REP 53 and the second REP 54 are in charge of inbound telephone processing and e-mail processing. The third REP 55 is in charge of outbound telephone processing and e-mail processing. Inbound telephone calls are first responded to by the VRU 56; those that cannot be answered automatically are responded to by the first REP 53 or the second REP 54, under the control of the MCICD 58.

The VRU 56 responds with automatic answering to telephone calls that arrive via a public network, and as needed makes a queue registration request, as shown in FIG. 3. The queue registration request in this instance is a real-time queue. The e-mail agent 57 makes a queue registration request such that e-mail that has arrived at the e-mail server 52 is registered as a delayed queue. Also, in accordance with pre-planned promotions and other outbound lists, the request queue is registered at the MCICD 58.

At a predetermined interval (e.g., one-minute intervals) the e-mail agent 57 performs acquisition of e-mail that has arrived at the e-mail server 52; if e-mail has arrived, the e-mail agent 57 performs queue registration at the MCICD 58.

Using the current status sent by the REPs 53, 54, and 55, the MCICD 58 can monitor the statuses of the REPs 53, 54, and 55; if there is an e-mail arrival queue, it selects a REP with available status and periodically attempts the queue reporting process.

The VRU 56 responds by giving a temporary answer over the phone; in the event that it determines that a call should be forwarded to a REP, it makes a queue registration request to the MCICD 58. When the MCICD 58 determines that there has been a queue registration request from the VRU 56 and that this requires real-time processing, it immediately sends out a queue report to a REP capable of handling the response.

Queues generated by e-mail are delayed queues with a priority lower than that of normal inbound telephone queues; in order to do the utmost to avoid being unable to process inbound telephone calls, the system is set up so that at least one REP is always available. Therefore, e-mail queue reports are made so that at least one of the REP 53 and REP 54 that perform inbound processes is always available.

The third REP 55 performs a set proportion of outbound tasks and e-mail processes, based on such factors as priority. If the backlog of e-mail delayed queues increases, the hold time for the queues lengthens, and their priority automatically rises. As mentioned earlier, the system can be constituted so that when a predetermined amount of time has elapsed since the registration of a delayed queue managed by the queue manager in the MCICD 58, delayed queue reports are given priority, thereby performing the backlog of e-mail processes before outbound tasks such as campaigns. When inbound telephone calls have increased, there is the possibility that the REP 53 and REP 54 cannot perform e-mail processes and the backlog of e-mail delayed queues will increase; in such a case the REP 55, which is in charge of outbound tasks, can be made to give priority to processing the e-mail queues, thus helping to reduce the backlog.

No restrictions are placed herein on the configurations of the REP, VRU, e-mail agent and other channels. It is also possible to mix in REPs who handle both inbound tasks and outbound tasks. In such an instance, it is preferable to set up the system so that at least one REP is available to handle inbound tasks.

Urgent Mail

The system may be configured so that certain e-mails from among those e-mails for which the e-mail agent 57 has made a registration request are processed by priority, according to their content. For example, if the sender of an e-mail that has arrived at the e-mail server 13 is a specific, pre-registered mail address, the e-mail is sent to the REP 14 for priority processing, and the operator is made to carry the process out.

For example, the mail address of a priority customer is registered in advance. When a queue registration request comes from the e-mail agent system 17, the sending address is compared against the registered e-mail addresses. When there is a match, a queue report is sent to the REP 14. This makes it possible to give priority to performing services for priority customers. For parties for whom access by telephone is difficult, their mail addresses are registered in advance; if the sending address of an arriving e-mail matches a registered address, the contents are judged to be urgent, and a queue report is sent to the REP 14. Such a configuration would be capable of responding to emergency calls from health care facilities and the like.

With the present invention, speedy response to real-time process requests is possible, as is allocating delayed queues to the processing terminal that has been registered as most appropriate. As a result, both real-time and delayed processing are performed efficiently, making it possible to maintain a high level of service for customers.

For inbound system queues, which in terms of timing are scattered, it is more efficient to have a processing terminal notified when a request is generated; for outbound systems queues, which in terms of timing are dense, it is more efficient to have the processing terminals sequentially make acquisition requests. Because the present invention takes advantage of the merits of both systems when performing queue reporting control, more efficient processing is achieved.

The allocation logic allocates the process requests to the processing terminals. By modification thereof, system modifications making for channel expansion can be handled easily, thereby providing a system with good expandability.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A multi-channel processing control device comprising:
a memory;
a processor;
a process request determination unit accepting a plurality of process requests from plurality of channels as communication between a user and call center, and determining whether any of the plurality of process requests from the plurality of channels are real-time process requests needing processing in real-time, or non-real-time process requests not needing processing in real-time, the determining based on both a determined channel class of a plurality of channel classes that generates said process requests and based on services in a determined queue category of a plurality of queue categories; wherein the plurality of channel classes including an operator terminal channel class, a Web agent channel, an e-mail agent channel class, a Customer Relationship Management (CRM) agent channel class, a supervisor channel class, and a segment analysis channel class, and the plurality of queue categories including an effective callback queue category, a no answer callback queue category, a follow-up call queue category, a campaign queue category, a web forwarding, an e-mail forwarding queue category, and an e-mail transmission queue category;
a non-real-time processing administrating unit changing processing requests among processing requests determined to be the non-real-time processing requests to the real-time processing requests when data relating to clients as processing objects is predetermined client data, and for administrating other non-real-time processing requests with priority levels therefore;
a real-time processing allocation unit allocating process requests determined to be real-time process requests to processing terminals that are currently available among a plurality of processing terminals connected to a plurality of channels capable of a real-time process; and a non-real-time processing allocation unit allocating non-real-time processes administrated by said non-real-time processing administrating unit to any of the processing terminals, said allocation performed with consideration given to the priority level and to suitability of the terminal for handling the process.

2. A multi-channel processing control method comprising:

accepting a plurality of process requests by a server from a plurality of channels as communication means between a user and call center, and determining whether any of the plurality of process requests from the plurality of channels are real-time process requests needing processing in real-time, or non-real-time process requests not needing processing in real-time, the determining based on both determined channel class of a plurality of channel classes that generates said process requests and based on services in a determined queue category of a plurality of queue categories; wherein the plurality of channel classes including an operator terminal channel class, a Web agent channel, an e-mail agent channel class, a Customer Relationship Management (CRM) agent channel class, a supervisor channel class, and a segment analysis channel class, and the plurality of queue categories including an effective callback queue category, a no answer callback queue category, a follow-up call queue category, a campaign queue category, a web forwarding, an e-mail forwarding queue category, and an e-mail transmission queue category;

changing processing requests among processing requests determined to be the non-real-time processing requests to the real-time processing requests when data relating to clients as processing objects is predetermined client data, and for administrating other non-real-time processing requests with priority levels therefore;

allocating those real-time process requests to processing terminals that are currently available among a plurality of processing terminals connected to a plurality of channels capable of a real-time process; and allocating a non-real-time process request currently being administrated to a most appropriate processing terminal, based on the priority level of the request and suitability of available processing terminals capable of processing said non-real-time process request.

3. A computer-readable storage medium on which is recorded a computer program for a multi-channel control method capable of being executed by a computer, the method comprising:

accepting a plurality of process requests from a plurality of channels as communication means between a user and call center;

determining whether any of a plurality of process requests generated from a plurality of channels are real-time process requests needing processing in real-time, or non-real-time process requests not needing processing in real-time, the determining based on both a determined channel class of a plurality of channel classes that generates said process requests and based on services in a determined queue category of a plurality of queue categories; wherein the plurality of channel classes including an operator terminal channel class, a Web agent channel, an e-mail agent channel class, a Customer Relationship Management (CRM) agent channel class, a supervisor channel class, and a segment analysis channel class, and the plurality of queue categories including an effective callback queue category, a no answer callback queue category, a follow-up call queue category, a campaign queue category, a web forwarding, an e-mail forwarding queue category, and an e-mail transmission queue category;

allocating those real-time process requests to processing terminals that are currently available among a plurality of processing terminals connected to a plurality of channels capable of a real-time process; and allocating a non-real-time process request currently being administrated to a most appropriate processing terminal, based on the priority level of the request and suitability of available processing terminals capable of processing said non-real-time process request;

administrating said non-real-time process request as well as a priority level therefor.

4. A computer network capable of transmitting a computer program for a multi-channel control method, the computer network comprising:

a plurality of processing terminals;

a dispatcher determining whether any of a plurality of process requests generated from a plurality of channels are real-time process requests needing processing in real-time, or non-real-time process requests not needing processing in real-time, the determining based both a determined channel class of a plurality of channel classes that generates said process requests and based on services in a determined queue category of a plurality of queue categories and allocating those real-time process requests to processing terminals that are currently available among the plurality of processing terminals connected to a plurality of channels capable of a real-time process;

wherein the plurality of channel classes including an operator terminal channel class, a Web agent channel, an e-mail agent channel class, a Customer Relationship Management (CRM) agent channel class, a supervisor channel class, and a segment analysis channel class, and the plurality of queue categories including an effective callback queue category, a no answer callback queue category, a follow-up call queue category, a campaign queue category, a web forwarding an e-mail forwarding queue category, and an e-mail transmission queue category;

a non-real-time processing allocation unit allocating non-real-time processes administrated by said non-real-time processing administrating unit to any of the processing terminals, said allocation performed with consideration given to the priority level and to suitability of the terminal for handling the process;

a non-real-time processing administrating unit changing processing requests among processing requests determined to be the non-real-time processing requests to the real-time processing requests when data relating to clients as processing objects is predetermined client data, and for administrating other non-real-time processing requests with priority levels therefore.

* * * * *

UNITED STATES PATENT AND TRADEMARK OFFICE
CERTIFICATE OF CORRECTION

PATENT NO.        : 7,519,665 B1                                    Page 1 of 1
APPLICATION NO.   : 09/717262
DATED             : April 14, 2009
INVENTOR(S)       : Takashi Shimada et al.

It is certified that error appears in the above-identified patent and that said Letters Patent is hereby corrected as shown below:

Column 16, Line 46 Claim 4, change "web forwarding" to --web forwarding,--.

Signed and Sealed this

Thirtieth Day of June, 2009

JOHN DOLL
*Acting Director of the United States Patent and Trademark Office*